United States Patent
Schalk et al.

(10) Patent No.: US 9,211,615 B2
(45) Date of Patent: Dec. 15, 2015

(54) PROPELLER SERVICE METHOD

(75) Inventors: Peter Schalk, Aalburg (NL); Adrie Huijbregts, Breda (NL)

(73) Assignees: TRIDENT BV, Terneuzen (NL); WARTSILA FINLAND OY, Vaasa (FI)

( * ) Notice: Subject to any disclaimer, the term of this patent is extended or adjusted under 35 U.S.C. 154(b) by 553 days.

(21) Appl. No.: 13/638,870

(22) PCT Filed: Mar. 29, 2010

(86) PCT No.: PCT/EP2010/054106
§ 371 (c)(1),
(2), (4) Date: Apr. 3, 2013

(87) PCT Pub. No.: WO2011/120551
PCT Pub. Date: Oct. 6, 2011

(65) Prior Publication Data
US 2013/0199039 A1    Aug. 8, 2013

(51) Int. Cl.
| B23P 6/00 | (2006.01) |
| B63B 17/00 | (2006.01) |
| B63C 11/00 | (2006.01) |
| B63C 11/52 | (2006.01) |
| B63B 9/00 | (2006.01) |

(52) U.S. Cl.
CPC .............. *B23P 6/002* (2013.01); *B63B 17/0018* (2013.01); *B63C 11/00* (2013.01); *B63C 11/52* (2013.01); *B63B 2009/008* (2013.01); *Y10T 29/49318* (2015.01); *Y10T 29/49332* (2015.01); *Y10T 29/53096* (2015.01)

(58) Field of Classification Search
CPC ......... B23P 6/002; B63C 11/52; B63C 11/00; B63B 17/0018; B63B 2009/008; Y10T 29/49318; Y10T 29/53096
See application file for complete search history.

(56) References Cited

U.S. PATENT DOCUMENTS

| 624,198 A | 5/1899 | Eicke |
| 5,324,140 A | 6/1994 | Lopez et al. |
| 5,823,708 A * | 10/1998 | Dwight et al. .................. 405/12 |

FOREIGN PATENT DOCUMENTS

| CN | 201012745 Y | 1/2008 |
| GB | 2009290 A | 6/1979 |
| GB | 2220019 A | 12/1989 |
| GB | 2255582 A | 11/1992 |

* cited by examiner

*Primary Examiner* — Ryan J Walters
(74) *Attorney, Agent, or Firm* — Standley Law Group, LLP

(57) ABSTRACT

Disclosed is a method for maintenance of a ship propeller including the steps of: placing a flexible habitat having an open upper end over an uppermost blade and a portion of the propeller hub, and establishing a gas seal between the upper end of the habitat and the blade to close the habitat at its upper end. After fixing the lower end of the habitat relatively to the propeller, compressed gas is preferably introduced into the habitat to displace the water in the habitat. The apparatus for maintenance of a ship propeller under water comprises a flexible habitat with an open upper end. The habitat has a gas seal adapted to cooperate with a propeller blade surface to establish a gas seal to close the habitat at its upper end and fixing means adapted to fix the open lower end of the habitat relatively to the propeller. A means for introducing compressed gas into the habitat is provided.

16 Claims, 2 Drawing Sheets

PROPELLER SERVICE METHOD

TECHNICAL FIELD

The invention relates to a method for maintenance of a ship propeller while the propeller is under water, and further relates to an apparatus for carrying out such a method, i.e. an apparatus for maintenance of a ship propeller under water.

BACKGROUND OF THE ART

Like any other machine or its part, propellers of ships need maintenance from time to time, replacement of parts thereof as the case may be, or simply need repair when damaged for whatever reason.

There are basically two types of propellers, the first type is a usually single piece propeller with fixed blades, whereas the other usual type is an adjustable pitch propeller in which the blades are arranged so as to be adjustable with respect to a propeller hub.

There are usually different ways to carry out maintenance and/or repair of the propellers, these methods comprising docking a ship, so that the ship is outside the water and access to the propeller is easily possible also with large equipment.

Another possibility is to use divers who carry out repair work under water. However, in case of adjustable pitch propellers, there is the problem that removal of the blade from the hub necessarily exposes a hub opening to the seawater, so that seawater can enter the hub mechanism and/or oil is released form the hub mechanism. However, any release of oil into the water has to be strictly avoided because oil released from the hub causes water pollution, and seawater entering the hub mechanics may cause corrosion and later destroy the hub mechanics.

On the other hand, in the course of ordinary maintenance, sealings which are arranged at the root of the blade to seal against the hub for closing the hub opening, have to be replaced from time to time, since there occurs a certain wear when the blades are adjusted.

Document GB 22 55 582 A suggests a method and an apparatus for the maintenance of the propeller, i.e. exchange of a blade or of a blade sealing, using a housing which is placed or pulled over at least the uppermost blade and the hub. That housing is securely fixed to the hub and is then filled with compressed gas so as to displace the water from the housing in order to provide a dry space around the blade foot at the hub, so that persons entering the housing can work inside in a dry space. The mentioned document either suggests a huge solid housing with an extension to cover at least part of the propeller shaft or suggests a flexible housing which covers the blade and the hub.

However, the solid housing proposed in GB 22 55 582 A is a large and heavy element which requires adequate equipment for handling. Since ship propellers are quite large elements, the flexible housing covering at least the diameter of the ship propeller, as is mentioned in this document, is also large. Already due to the size, handling of these housings is complicated.

SUMMARY OF THE EXEMPLARY EMBODIMENTS

It is the object of the invention to suggest a method and an apparatus in which the disadvantages of the prior art are avoided.

This object is solved with a method according to claim 1 and with an apparatus according to claim 11. According to the invention, the method comprises the steps of placing a flexible habitat or housing having an open upper end over the uppermost blade of the propeller which needs the maintenance. The habitat is made to cover a portion of the propeller hub. The flexible habitat is thereby designed such that it only covers a part of the blade and at least the maintenance portion. Then, a gas seal is established between the upper end of the habitat and the blade, so as to close the habitat at its upper end. The lower end of the habitat is fixed with regard to the propeller so that the lower end of the habitat remains below the maintenance portion. Then, compressed gas is introduced into the habitat, so that the water in the habitat is displaced and the maintenance portion is above water level inside the habitat. Then, the maintenance work can be carried out there.

Ship propellers can be very large and have considerable diameters. By reducing the habitat to a smaller but sufficient space around the maintenance portion and containing the maintenance portion, there are several advantages observed.

The material of the habitat can be selected less stable, so that the flexible material is lighter and softer and, thus easier to handle. The less stable material can be chosen, because the total buoyancy of the smaller habitat is significantly smaller as compared to a large habitat covering the whole blade. Then, of course, if the buoyancy is smaller, also the fixing equipment for fixing the habitat to the propeller or with respect to the propeller can be made much more lightweight and less strong to withstand the buoyancy forces of the habitat which are significantly smaller.

Generally, inside the habitat, the gas pressure has to be maintained on basically the same level as the pressure at the lower end of the habitat which is open and at which the air/water border is established. On large ship propellers with large habitats, the habitat extends over a considerable height in the water (water column), so that the pressure difference between the gas pressure inside the habitat and the water pressure in the water increases from bottom to top of the habitat. Although it may appear that these pressure differences are low as compared to pressures normally involved in diving, with regard to the material strength of the habitat it is a significantly different performance requirement, if there pressure differences which the material must withstand are several hundred mbars lower, as is the case in the solution of the present invention.

Furthermore, establishing the gas seal between the blade and the habitat does not require a hermetic seal, it is sufficient if the compressed air supply is sufficient to maintain the desired pressure within the habitat although there is some gas loss through the gas seal between habitat and blade. This makes the design and application of the gas seal simple. Besides, as a further advantage, the loss of gas ensures that sufficient gas supply is provided, so that workers working in the habitat always get sufficient gas supply of breathable air in case the compressed gas is breathable air.

Advantageously, the gas seal between the blade and the habitat can be obtained by clamping the blade from two sides, this leads to a simple design of the seal. In particular, the gas seal may be established by clamping a pair of clamping bars which are connected to each other and press a flexible sealing material provided between the bars and the blade surface, so as to establish the gas seal there. The bars and/or the seal material may be fixedly provided with the habitat as a gas seal. On the other hand, for example, it is sufficient if the habitat has an elastic sealing material ring along its open upper end and separate clamping bars clamp this elastic sealing material ring against the blade.

Alternatively and also advantageously, the sealing material may be an inflatable material, such as for example a hose made from flexible material, so that the inflatable material can be inflated to expand between bars and blade surfaces. With this design, the final sealing pressure between the sealing and the blade surface is establish by the later inflation. In this way, since the pressure exerts the same force to the blade surface over the whole length of the sealing line, pressure peaks or excessive mechanical clamping forces are avoided. Thus, unintended bending or damaging of the blade is unlikely to occur.

In many cases of blade maintenance or repair, it is required to lift the blade, be it for the exchange of the blade or for the exchange of a blade sealing at the root portion of the blade. In order to lift or hoist the blade, preferably a load bearing means such as straps or rods may be employed to connect a portion of the blade, preferably the root portion of the blade, inside the habitat with at least one of the clamping bars. That at least one of the bars can then be provided with hoisting means, which can then be used to lift the blade and the habitat together to the required height. In particular, the gas seal formed from the bars and some flexible sealing material is connected to the blade root inside the habitat, whereas the gas seal with its bars can be connected to a hoist means for lifting the blade. In this way, it is not necessary to exert clamping forces to the gas seal which have to withstand the lifting forces (the blade weight), instead, the weight of the blade is borne by the load bearing means.

It is noted, that it is also possible to simply drill a hole into the blade or to fix hoisting eyes to the blade in known manner. In a further alternative solution, a set of lifting clamping bars may be provided, which clamp the blade outside the habitat and to which the hoisting equipment is connected for lifting the blade. These respective auxiliary equipments for lifting the blade may be provided on a blade portion, which is radially, i.e. in blade length direction, outside of the habitat with respect to the propeller hub, so that the provision of such lifting equipment to the blade does not affect operation of the habitat at all and vice versa.

The method according to the invention develops particular advantage, when it is used for exchanging a blade or for exchanging a blade seal. In the latter case, the habitat is placed in position, so as to make the maintenance space a dry space above water level, and that it is then possible to release the blade from its fixing in the hub. Hoist means provided on the blade secure the blade in position when the blade bolts a screwed out. It may be possible to provide additional lifting means inside the habitat just for lifting the blade bolts which may be considerable heavy.

Once the bolts are removed, the blade may be lifted by the lifting means and the habitat can have enough slack which allows a sufficient lifting of the blade, so that the seal at the root portion of the blade can be exchanged. It is considered that for exchanging the seal, manual access to the blade root sealing portion is considered sufficient.

When the blade is to be exchanged, the following is a preferable way of doing it. It is preferable that, when the blade is provided with a habitat as described before, the blade is released form its bolting at the root portion and is lifted to a certain extend, so that the slack of the habitat provides of a dry portion of the hub, in which the blade root is usually received. The opening in the hub is now closed with a blind flange. Then, the blade is lifted together with the habitat to be exchanged by another blade. In order to reduce the time, the replacement blade may already be prepared with a second similar habitat and may then be lifted into position, the lower end of the habitat is fixed with respect to the propeller hub and gas is introduced so as to displace the water in the habitat. Then, the blind flange may again be removed and the replacement blade is mounted in its position in the opening of the hub. After that, all connections between habitat and blade may be released, the habitat is removed and the replacement of the blade is finished.

Instead of providing a replacement blade with its own habitat, it is possible to move the habitat from the original blade to the replacement blade and to fix it there. It is noted that, in this case, also the blind flange in the meantime securely closes the opening of the hub.

If maintenance, blade exchange or seal exchange is to be continued at all blades of the propeller, the propeller is rotated to bring the next blade to be treated into its uppermost position. Then again the habitat is brought into its position, the gas seal is established and the methods are continued as described above.

In an advantageous modification of the method, the method includes a step of shaping the bars to clamp the seal to the propeller into a shape substantially following the blade shape at the desired sealing line. With this method step it can be avoided that a propeller becomes damaged by using straight bars which are very strongly clamped together; especially, unintended bending of the thin rear edge portion of the propeller blade can be avoided.

In the foregoing it has been stressed that, according to the invention, the habitat only covers a part of the blade, i.e. the root portion of the blade. At typical propeller diameters of up to nine meters, it is considered a good value if the length of the habitat is selected such that the sealing may be positioned at a radial distance from the hub corresponding to about 30% to 70% of the blade length, i.e. of the propeller radius direction.

The invention also provides an apparatus for maintenance of a ship propeller under water. The apparatus comprises a flexible habitat which has an open upper end and the habitat has a gas seal adapted to cooperate with a propeller blade surface, so as to establish a gas seal to close the habitat at its upper end. Further, fixing means are provided to fix the open lower end of the habitat relatively to the propeller. In order to displace the water from the habitat mounted in its position, a means for introducing compressed gas is provided.

The habitat is made of a flexible material which is preferably strong enough to withstand typical handling in dockyard environment. Also, a certain gas tightness of the materials is required. So, preferably, the habitat is a rugged element made from fabric materials coated with plastics or rubber, made of a fabric material or is made of a plastic foil material.

The habitat can preferably have the form of a large fabric tube or hose which has a flexible sealing ring along its upper circumference. Such an elastic sealing ring can be used as a gas seal to cooperate with the blade surface, i.e. a sealing line between the blade and the habitat may be established, if the elastic sealing material is pressed against the blade surface.

When the habitat is to be filled with gas, there is a significant buoyancy force occurring pushing the habitat towards the water surface. In order to hold the habitat in the required position, fixing means are provided, with which the habitat can be fixed relatively to the propeller. Such fixing means may comprise simple D-rings and or eyes, straps and lines or even metal clamps to fix the habitat to the propeller itself. On the other hand, it is also possible to use fixing points different from the propeller; they may be on the ship hull or they may be provided as anchor points in the water below the ship. Of course, also combinations of these fixing means may be used.

Preferably, in order to easily establish a gas seal between the upper end of the habitat and the blade surface, clamping bars can be used, which are used to press the gas seal at the upper end of the habitat against a blade surface. As mentioned before, the gas seal may comprise an elastic sealing material which is pressed against the blade by means of the bars mentioned before. On the other hand, instead of an elastic sealing material or in addition to that material, preferably an inflatable sealing hose may be provided, which extends along the upper circumference or at least along the clamping bar, so that the hose may be inflated to establish a sealing function between the respective bar and the blade surface.

It is noted, that if an inflatable sealing hose is provided with a sufficient diameter, the hose may be used to compensate for the blade's shape, so as to avoid unintended bending of the blade when the bars are strongly clamped together.

Preferably, in the apparatus according to the invention, load bearing means may be provided inside the habitat, with which the gas seal can be connected to the blade in a load supporting manner. In particular, it is advantageous if the load bearing means are adapted to connect the gas seal to the blade root. With this arrangement, proper fixing of the habitat with regard to the blade is ensured.

In a particular solution, hoist means can be provided which can be connected to the gas seal from the outside of the habitat. In this case, lifting of the blade can be done by lifting the gas seal, while the weight of the blade is carried by the load bearing means fixed between gas seal and root portion of the blade.

With this solution, the mechanical equipment is significantly reduced or simplified, in that the gas seal may take over lifting means function for the blade and the gas seal function by using the same elements for two purposes, i.e. for example clamping bars for clamping and lifting.

It is noted that other hoisting means may be connected elsewhere to the blade, and since the radially outer part of the blade, i.e. the blade tip side, is still exposed and not covered by the habitat, any other suitable means for securely gripping the blade including holes drilled through the blade or hoisting eyes welded to the blade may be used. In a further alternative solution, a set of lifting clamping bars may be provided, which clamp the blade outside the habitat and to which the hoisting equipment is connected for lifting the blade. The use of such equipment is not obstructed by the habitat.

Fixing means for fixing the habitat may preferably be fixing means which fix the lower end of the habitat to the propeller hub directly. Such fixing means may comprise D-rings, eyes, straps, bands, cramps, chains, clamps or other suitable fixing equipment. The fixing means must be strong enough to hold the habitat securely in position with regard to the propeller hub, i.e. especially they must be strong enough to hold the buoyancy forces of the gas-filled habitat.

The dimensions of the habitat of the apparatus as well as the position of the gas seal with regard to the blade are preferably selected such that it is possible to place the gas seal on the blade at a distance from the hub which is within 30% to 70% of the blade length or the propeller radius. In typical propellers of large ships this gives enough working space for the maintenance work at the blade root, and, on the other hand, handling and transport of the smaller habitat is much easier. It may be the case that for repair on short notice, a transport of the equipment by air freight is necessary, so that reduced weight and size of the habitat significantly reduces the practicability of it.

Apart from that, the smaller volume reduces the consumption of compressed gas, as well as it reduces fixing effort to fix the habitat with regard to the propeller.

When the habitat is to be removed from the blade, it is preferably arranged that the gas is released from the habitat before releasing the fixing of the habitat to the propeller hub. Therefore, in order to increase working safety, preferably a flooding means or gas release means may be provided at or close to the upper end of the habitat, to release a compressed gas in a controlled manner before releasing the fixing means at the lower end of the habitat.

BRIEF DESCRIPTION OF THE DRAWINGS

The invention will now be described in detail by reference being made to an embodiment of the apparatus of the invention. The method of the invention will be explained using the embodiment shown in the attached drawings. In the drawing.

DETAILED DESCRIPTION

Figure 1:
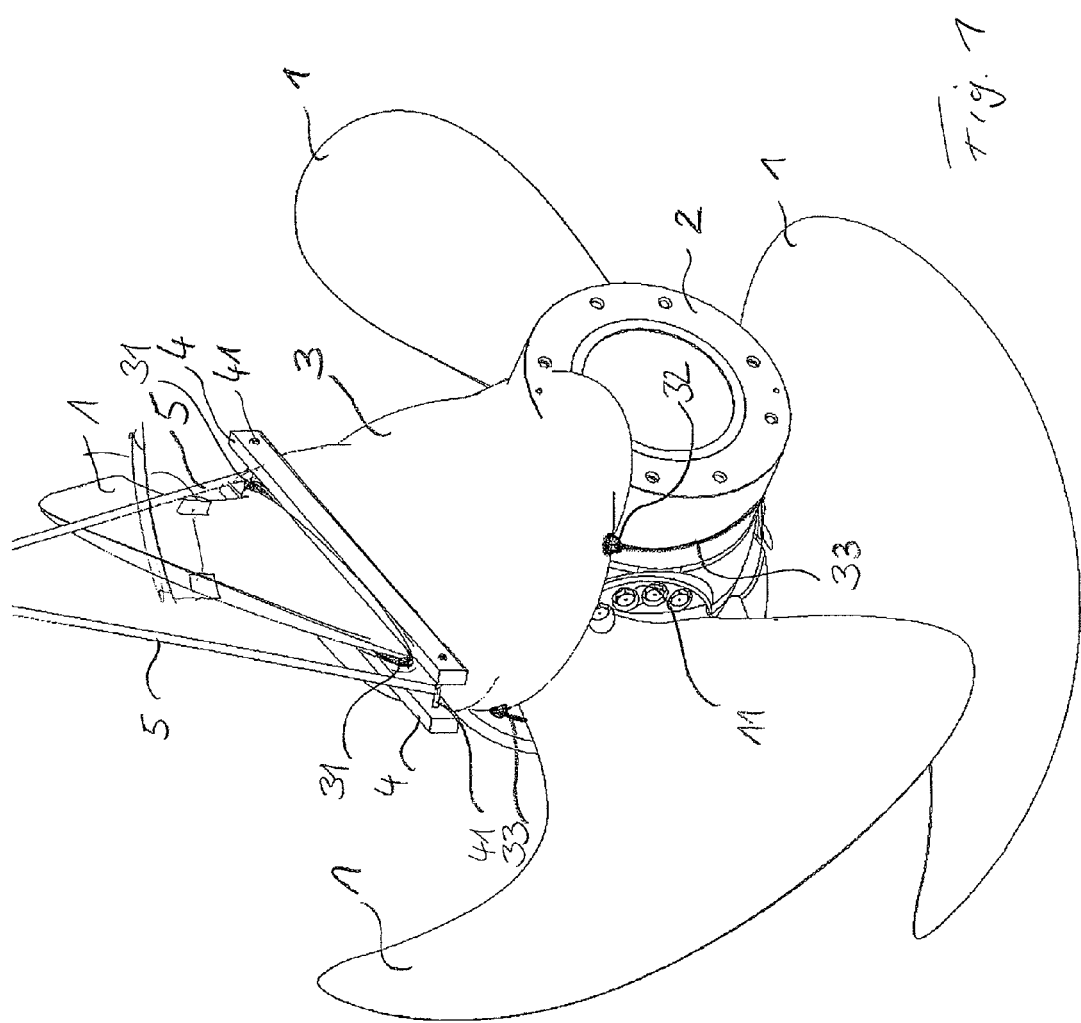
FIG. 1 shows a schematic drawing of an embodiment of an apparatus according to the invention.

FIG. 1 shows a three-dimensional schematic drawing in which a propeller is shown, to which a habitat according to an embodiment of the invention has been fixed. In particular, the propeller has blades 1 which are arranged around a hub 2. The propeller of FIG. 1 is an adjustable pitch propeller in which the blades 1 may rotate around their root portion indicated by reference sign 11. The root portion has screws with which the blade 1 is mounted to the hub 2.

Further, FIG. 1 shows a habitat 3 made of a flexible material and put over the root portion 11 of a blade 1 which is in the uppermost position. As is further shown, the flexible habitat 3 also covers a part of the hub and the habitat has fixing points 32 (D-rings) to which fixing straps 33 are fixed which straps go around the hub 2 to hold the lower edge of the habitat 3 in position. On the upper end of the habitat 3 is provided a sealing 31, which goes around the blade 1 at about half way of its radial length as can clearly be seen in FIG. 1. Associated with the sealing 31 at the upper end are two bars 4, which are clamped to each other by means of bolts 41. By clamping the seal 31 against the surface of the blade 1, substantial sealing of the habitat 3 to the surface of the blade 1 can be obtained.

The habitat 3 in FIG. 1 is shown only in uninflated or only partly inflated state. However, once inflated, the habitat 3 will expand under inner gas pressure to obtain a substantially cylindrical shape. Accordingly, inside the cylindrical shape there is a cylindrical dry space, in which maintenance work can be carried out. It is not necessary that seal 31 is hermetically gas tight, if there is some air leakage when compressed air is introduced into the habitat 3, then it is sufficient if the leakage is smaller than a further gas supply into the habitat, i.e. maintaining the pressure in the habitat 3 is sufficient.

Figure 2:
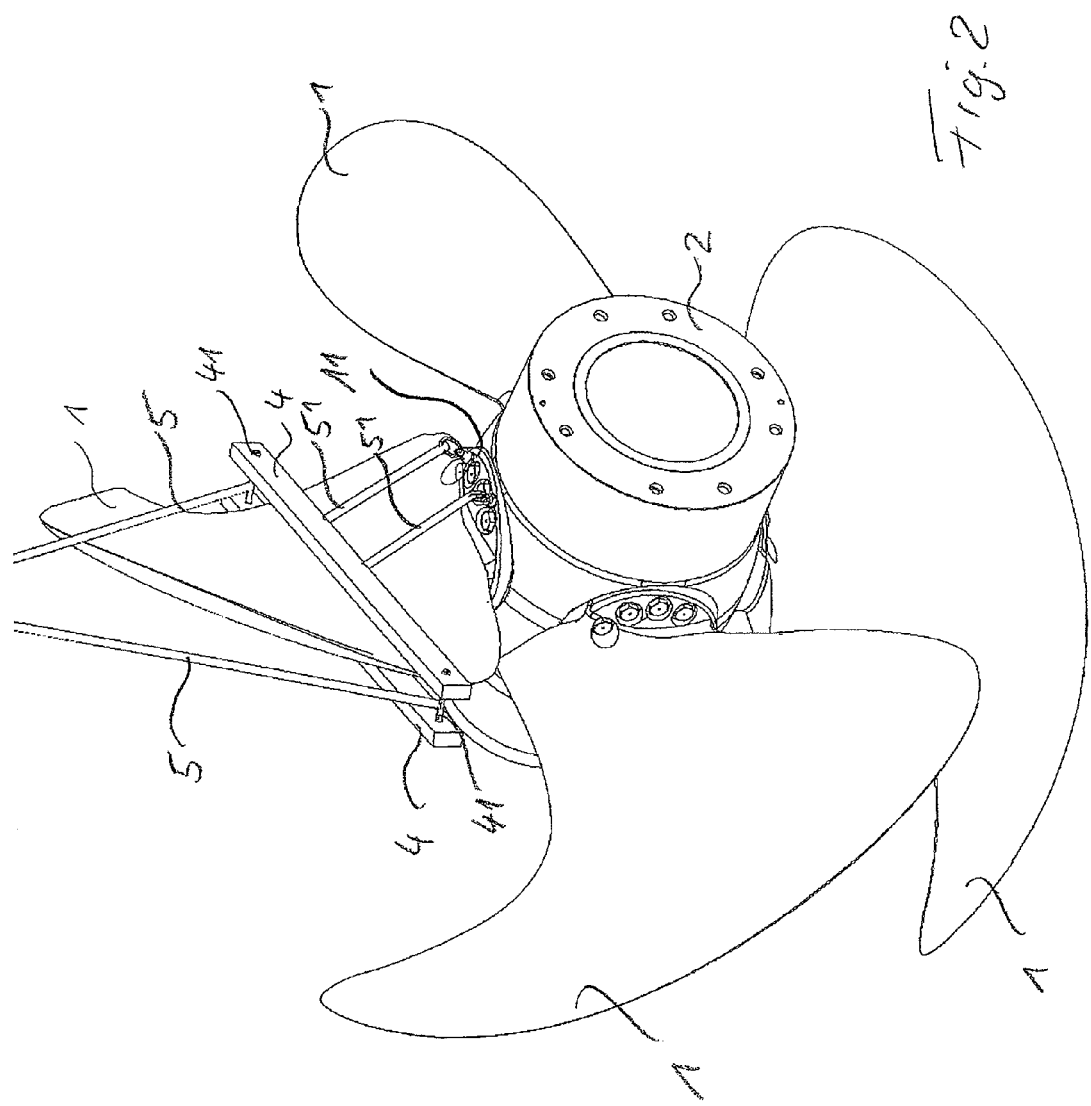
FIG. 2 shows the embodiment of FIG. 1 with the habitat removed to show the inside of it.

Reference is now additionally made to FIG. 2. The maintenance work on the blade 1 may include exchange of a sealing (not shown) at the root portion 11 of the blade. For this, it is necessary to release the fixing bolts and to at least slightly lift blade 1 from hub 2. For lifting the blade 1, hoist means are provided which are composed of load bearing straps 51, the bars 4 of the gas seal, the bolts 41 of the bars and lifting ropes 5 cooperating with the bolts. In that manner a very simple arrangement of a lifting means for the blade is provided. In particular, the load bearing straps 51 are adapted to be fixed to the blade root portion 11 and are on the other end fixed to the bars 4 inside the habitat 3. Bars 4 are connected to each other by bolts 41. These bolts 41 also go through lifting eyes (not shown) of lifting ropes 5 which are then connected to a suitable hoist means like a crane or the like.

Of course, the lifting ropes 5 may be connected to other elements of the gas seal, in particular the bars 4. In this way, there is no complicated passage of the hoist means from outside the habitat to the inside of the habitat, so that no complicated sealing effort is required. In particular, due to this structure, the bars 4 cooperating with the sealing 31 maybe provided with the load bearing straps 51 already before the habitat 3 is put or placed over the blade 1, so that fixing the blade root to the load bearing straps can easily be done inside the inflated habitat.

Although this is not shown here, inside the habitat 3 and in cooperation with the bars 4, their may be auxiliary hoisting means provided, which can be used for lifting or pulling out the blade bolts or screws from the blade root, these bolts can have a weight of up to 40 kg each, and may be also difficult to pull out.

In addition, there may be a frame attached to the bar at the inside of the habitat to place toolings and/or components on beforehand or during maintenance work. Components may be packed in a watertight bag or box which is to be opened after the habitat has been inflated and the water is removed therefrom. This is an easy way to get components dry into the habitat under water; in particular these materials do not have to be carried by divers.

Furthermore, although also not shown here in this figure, a gas relief valve may be provided close to the upper edge of the habitat 3. Once the habitat is inflated, it develops substantive buoyancy forces which are born by the fixing straps 33 in FIG. 1 for example. Now, if the blade is to be lifted to be taken out for replacement, it is necessary to either remove the habitat from the blade before lifting or, as is preferred, to lift the blade together with the habitat. When the fixing straps 33 are released while the habitat is inflated, it may develop an uncontrolled floating behaviour under water.

In other to avoid this, a gas relief valve at or close to the upper end of the habitat will allow flooding the habitat in controlled manner from below, so that this dangerous situation with an uncontrolled floating habitat is avoided. It is noted, that is sufficient if there is an air hose provided close to the upper end of the habitat, which air hose is closed by a valve. When opening the valve inside the habitat, air will be pressed outside as long as the valve is above water level inside the habitat.

It is noted, that the habitat 3 is entered from below by divers, once the habitat is inflated. For this, fixing of the lower edge of the habitat 3 should suitably have sufficient play with regard to the hub, so that entering is easily possible.

What is claimed is:

1. A method for maintenance of a ship propeller while the propeller is under water, comprising the steps of:
    placing a flexible habitat having an open upper end over an uppermost blade and a portion of a propeller hub such that the habitat covers a part of the blade and at least a maintenance portion,
    establishing a gas seal between the upper end of the habitat and the blade to close the habitat at the upper end by clamping the blade from two sides using a pair of clamping bars which are connected to each other and press a flexible sealing material provided between each of the bars and the blade surface,
    fixing a lower end of the habitat relative to the propeller such that the lower end of the habitat remains below the maintenance portion, and
    introducing compressed gas into the habitat to displace the water in the habitat, so that maintenance work can be carried out at the maintenance portion above water level inside the habitat.

2. The method according to claim 1, wherein the sealing material is an inflatable material and said material is inflated to expand between one of the bars and the blade surface.

3. The method according to claim 1, wherein the maintenance requires lifting of the blade, wherein the method comprises a step of fixing load bearing means inside the habitat to a root portion of the blade, said load bearing means connecting the root portion to the gas seal, and wherein a hoist means for lifting the blade is fixed to the gas seal from outside of the habitat.

4. The method according to claim 3 further comprising the steps of loosening the connection of the blade to the hub at the root, lifting the blade with the hoist means while the blade is inside the habitat, exchanging the blade seal, lowering the blade and fixing the root.

5. The method according to claim 3, further comprising the step of loosening a connection of the blade to the hub, lifting the blade to allow closing of a hub opening with a blind flange, loosening the fixing of the habitat with respect to the hub, lifting the blade and the habitat away from the propeller to provide a replacement blade with the habitat, lowering the replacement blade and the habitat, fixing the lower end of the habitat with respect to the propeller, discharging water in the habitat by introducing compressed gas, removing the blind flange from the hub opening and lowering the replacement blade and fixing the root to the hub.

6. The method according to claim 1, wherein the step of establishing a gas seal includes a step of shaping a pair of clamping bars to adapt them to the shape of the blade along an intended sealing line.

7. The method according to claim 1, wherein the gas seal is fixed to the blade at a distance from the hub, which distance is between 30 and 70% of a blade length.

8. The method according to claim 1, wherein the compressed gas is breathable air.

9. An apparatus for maintenance of a ship propeller under water, comprising
    a flexible habitat having an open upper end, said habitat having a gas seal adapted to cooperate with a propeller blade surface of a propeller blade to establish a gas seal to close and seal the habitat at the upper end,
    a fixing means adapted to fix the open lower end of the habitat relative to the propeller, and
    a means for introducing compressed gas into the habitat to displace the water in the habitat,
    wherein the gas seal comprises a pair of clamping bars which are connectable to each other and are adapted to press a flexible sealing material provided between the bars and the blade surface.

10. The apparatus according to claim 9, wherein the gas seal comprises an inflatable sealing hose extending along one of the clamping bars and adapted to be inflated so as to establish a sealing line between the bar and the blade surface.

11. The apparatus according to claim 9, wherein the habitat comprises load bearing means inside the habitat, which load bearing means are connectable to a root portion of the propeller blade to fix the gas seal to the blade.

12. The apparatus according to claim 11, wherein the gas seal comprises hoist means on the outside of the habitat, which hoist means are connected to the load bearing means via the gas seal.

13. The apparatus according to claim 12, wherein the hoist means comprises a lifting rope for lifting the blade within or together with the habitat.

14. The apparatus according to claim 9, further comprising fixing means for fixing the lower end of the habitat to the propeller hub.

15. The apparatus according to claim 9, wherein the lower end of the habitat is fixed relative to the propeller and the gas seal is fixed to the blade at a distance from the hub, which distance is between 30 and 70% of a blade length, the blade can be lifted within the habitat by at least 20 cm.

16. The apparatus according to claim 9, wherein the habitat comprises a flooding means through which the compressed gas can be released.

\* \* \* \* \*